(12) United States Patent
Cheng et al.

(10) Patent No.: US 8,174,483 B2
(45) Date of Patent: May 8, 2012

(54) AUTOMATIC DISPLAY UNIT ACTIVATION

(75) Inventors: Chung Ming Cheng, Tsuen Wan (HK); Ho Sin Vincent Chan, Heng Fa Chuen (HK)

(73) Assignee: Computime, Ltd., Hong Kong (HK)

( * ) Notice: Subject to any disclaimer, the term of this patent is extended or adjusted under 35 U.S.C. 154(b) by 810 days.

(21) Appl. No.: 12/034,391

(22) Filed: Feb. 20, 2008

(65) Prior Publication Data

US 2009/0207122 A1  Aug. 20, 2009

(51) Int. Cl.
G09G 3/36 (2006.01)
G09G 5/00 (2006.01)

(52) U.S. Cl. ........................................ 345/102

(58) Field of Classification Search ............... 345/211, 345/204, 690, 156, 169, 102, 87, 89
See application file for complete search history.

(56) References Cited

U.S. PATENT DOCUMENTS

| | | | |
|---|---|---|---|
| 5,910,653 A * | 6/1999 | Campo | 250/214 AL |
| 5,943,801 A | 8/1999 | Wilkinson | |
| 6,002,386 A * | 12/1999 | Gu | 345/690 |
| 6,107,930 A * | 8/2000 | Behlke et al. | 340/825.19 |
| 6,175,353 B1 * | 1/2001 | Hoeksma | 345/102 |
| 6,650,322 B2 | 11/2003 | Dai et al. | |
| 7,583,253 B2 * | 9/2009 | Jeng et al. | 345/156 |
| 2006/0164230 A1 | 7/2006 | DeWind et al. | |
| 2006/0186214 A1 | 8/2006 | Simon et al. | |
| 2007/0075965 A1 | 4/2007 | Huppi et al. | |
| 2007/0085157 A1 | 4/2007 | Fadell et al. | |
| 2007/0241203 A1* | 10/2007 | Wagner et al. | 236/1 C |

FOREIGN PATENT DOCUMENTS

| | | |
|---|---|---|
| CN | 1690767 A | 11/2005 |
| CN | 1831917 A | 9/2006 |
| JP | 2003337186 | 11/2003 |
| WO | 9957601 A1 | 11/1999 |

OTHER PUBLICATIONS

Hinckley, Ken et al., "Toward More Sensitive Mobile Phones," Symposium on User Interface Software and Technology Archive, Proceedings of the 14th Annual ACM Symposium on User Interface Softward and Technology; 2001; pp. 191-192.
International Search Report for PCT/CN2009/070483, dated May 28, 2009, pp. 1-3.

* cited by examiner

*Primary Examiner* — Duc Dinh
(74) *Attorney, Agent, or Firm* — Banner & Witcoff, Ltd.

(57) ABSTRACT

The present invention provides apparatuses and methods for controlling the brightness of a display unit based on detected movement of an external object such as a user. An apparatus includes a display, e.g., a color liquid crystal display (LCD) or organic light emitting diode (OLED). A proximity circuit generates a transmitted signal and a received signal. The received signal results from the transmitted signal being reflected by an external object. A control unit processes the received signal to determine a degree of motion of the external object. When the degree of motion is greater than a first predetermined threshold but not greater than a second predetermined threshold, the display is activated and operating at partial intensity. When the degree of motion is greater than the second predetermined threshold, the display is activated at full intensity. The degree of motion may be determined from the variation of the received signal.

22 Claims, 7 Drawing Sheets

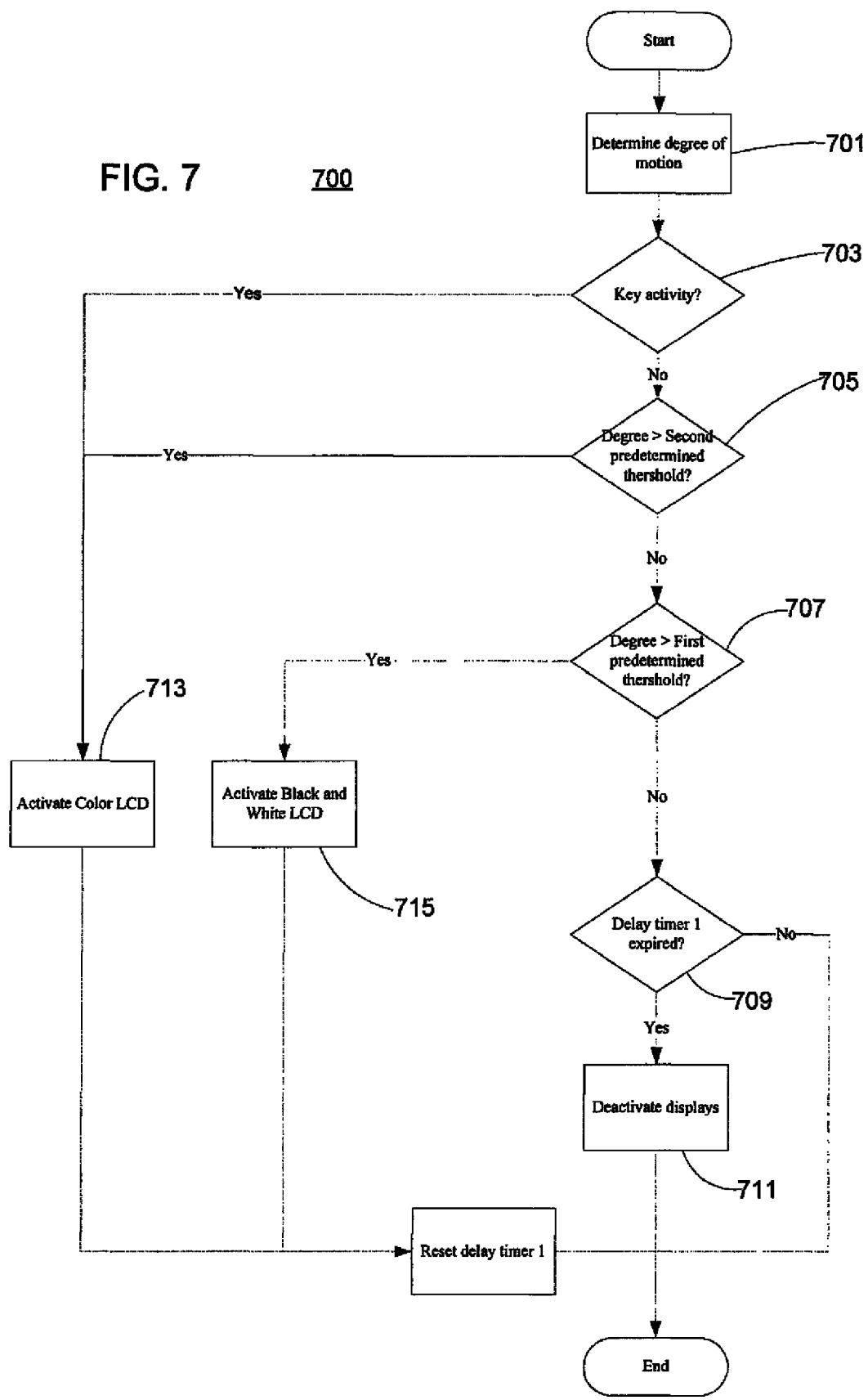
FIG. 7    700

AUTOMATIC DISPLAY UNIT ACTIVATION

BACKGROUND OF THE INVENTION

Color displays are becoming more popular in electrical systems, e.g., a thermostat. Moreover, a color display can help a user to better understand displayed information provided by a modern programmable thermostat. However, a color display's application with a battery powered thermostat is typically limited for several reasons. First, a color display, e.g., a liquid crystal display (LCD), typically requires a backlight that may consume a significant amount of power in relation to the battery's power capacity. Other self-illuminated displays, e.g., an Organic Light Emitting Diode (OLED), typically require higher power than ordinary black and white LCD. Also, associated processing for a color display is typically significantly larger than associated processing for a black and white display. The additional processing increases the power consumption of the processor.

Because of the enhanced capability provided by a color display in a thermostat, there is a real market need to reduce the required power consumption by the thermostat. Moreover, the expected lifetime of the color display can be extended to better match the expected service time of the thermostat.

SUMMARY OF THE INVENTION

The present invention provides methods and apparatuses for controlling the brightness of a display (and consequently the power consumption) based on detected movement of an external object such as a user.

With an aspect of the invention, an apparatus (e.g., a thermostat) includes a display, e.g., a color liquid crystal display (LCD) with a backlight or an organic light emitting diode (OLED) display. A proximity circuit generates a transmitted signal and a received signal. The received signal results from the transmitted signal being reflected by an external object. A control unit processes the received signal to determine a degree of motion of the external object. When the degree of motion is greater than a first predetermined threshold but not greater than a second predetermined threshold, the display brightness is activated at a partial intensity. When the degree of motion is greater than the second predetermined threshold, the display brightness is activated at full intensity.

With another aspect of the invention, when the display brightness is operating at partial intensity and the degree of motion subsequently increases above the second predetermined threshold, the display brightness is activated at full intensity.

With another aspect of the invention, the degree of motion is determined from the variation of the received signal.

With another aspect of the invention, the proximity circuit includes an infrared transmitter and an infrared receiver. (However, the proximity circuit may use another type of sensor, e.g., a passive infrared sensor (PIR), ultrasonic sensor, or Doppler-effect sensor.) A periodic signal is transmitted, and the received signal occurs because of reflections from an external object such as a user.

With another aspect of the invention, apparatus includes first and second displays, each having a backlight. The appropriate backlight is activated in accordance with the degree of motion of an external object. The first display may comprise a color LCD and the second display may comprise a black and white LCD.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

FIG. 7 shows a flow diagram for activating a backlight to a first display or the brightness of a second display in accordance with an embodiment of the invention.

DETAILED DESCRIPTION

Figure 1:
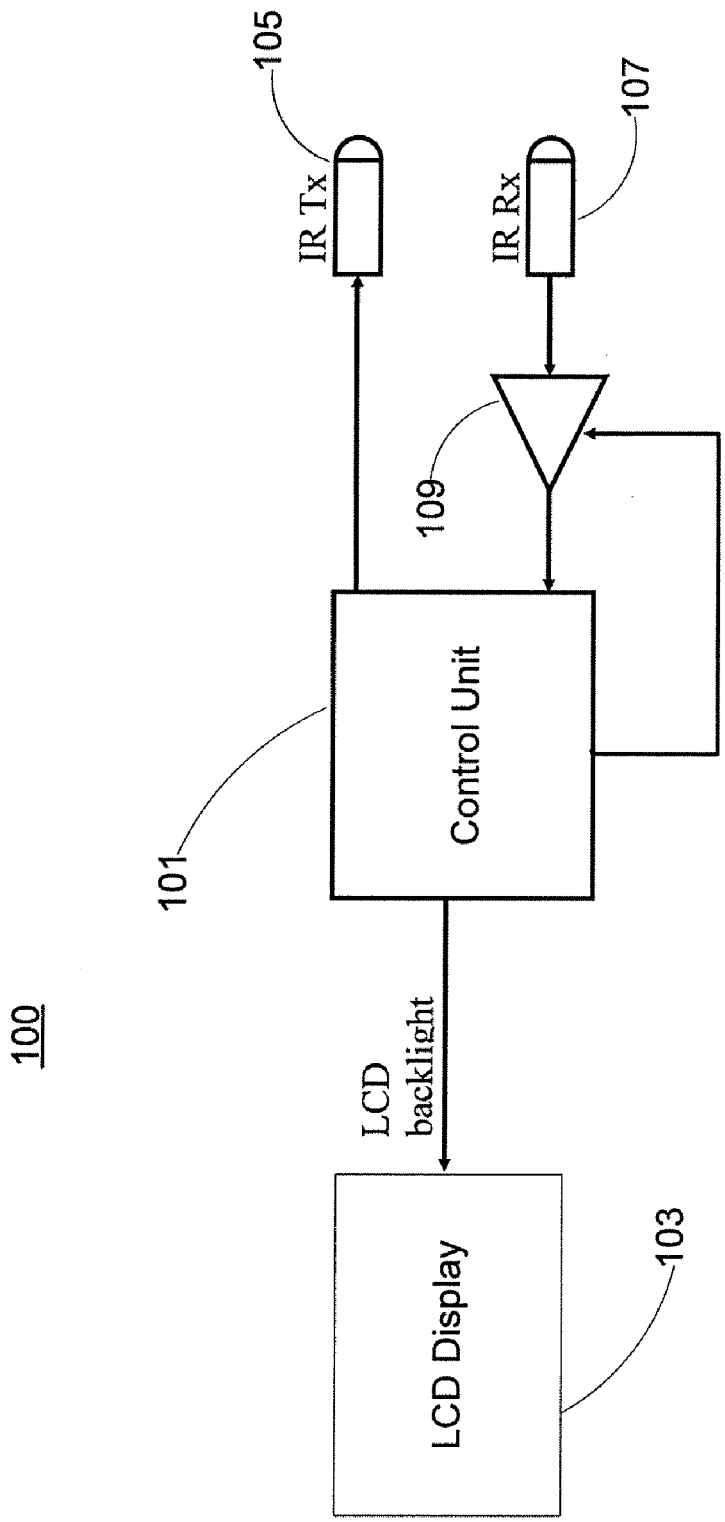
FIG. 1 shows a system that control the brightness of a display unit 103 based on a degree of motion in accordance with an embodiment of the invention.

FIG. 1 shows system 100 (e.g., a thermostat) that controls the brightness (intensity level) of a display (LCD or OLED) 103 based on a degree of motion in accordance with an embodiment of the invention. With a LCD display, the brightness of the display may be determined by the brightness of a backlight. However, an OLED display is typically self-illuminating and consequently does not require a backlight. Moreover, embodiments of the invention support other types of displays, e.g., a light emitting diode (LED) display.

Embodiments of the invention support different types of appliances, e.g., a thermostat and battery powered alarm clock. A supported appliance is typically characterized by one or more of the following attributes:

using a battery to provide power
  need to reduce power consumption to increase battery service time
  the display does not need to be turned on continuously Control unit (processor) 101 detects movement of a user (not shown) by sending a transmitted signal through infrared (IR) transmitter 105 and receives a received signal through infrared receiver 107 and amplifier 109. While proximity detection utilizes an infrared spectrum, embodiments of the invention may utilize other portions of an electromagnetic spectrum, including radio or light (visible and invisible) frequencies.

As color displays (e.g., LCD or OLED 103) become more readily available and with the increased complexity of programmable thermostats, a color display may assist a user in understanding the information on display 103. With a color display, color may provide an inherent meaning. For example, red can denote hot and blue can denote cold. When the setpoint temperature is low, the thermostat may display the number in blue so that the user can realize the setpoint may be too low. Also, graphics are typically more practical to a user with a color display than with a black and white display.

While the following discussion of display 103 refers to a color display, display 103 may comprise a black and white LCD with embodiments of the invention. Moreover, embodiments of the invention may support other types of display units (e.g., organic light emitting diodes) that do not require a backlight.

A color display's application in a battery powered thermostat may be limited for several reasons. First, color display 103 display typically needs a backlight. (With embodiments of the invention, a backlight comprises an array of at least one light emitting diode (LED). The brightness the LED array may be controlled by varying the voltage of the applied power signal or by varying the duty cycle of the applied signal.) Unlike a black and white LCD, a color LCD (e.g., thin film transistor (TFT) or color super twisted nematic (CSTN) display) requires a backlight to view the display. On the other hand, with an OLED display the current consumption is related to the number of turn-on pixels as well as the brightness of the pixel. For a battery powered thermostat, an illuminated display may impose an extremely heavy load on the power source.

Second, color display 103 may require an associated processor (e.g., control unit 101) to perform a large number of CPU operations. For a black and white LCD, one pixel or segment corresponds to only one bit in the memory, where either a "1" or a "0" corresponds to "on" or "off" of the pixel. However, with color display 103, one pixel corresponds to at least eight bits (256 colors), sixteen bits (65K colors), 18 bits (262K color), or even 24 bits (16M color) of memory. This requires a large memory and fast CPU cycles to control and thus results in high power consumption.

Third, the backlight of a color LCD has a limited life span, typically 50,000 hours or 6 years. This is shorter than the typical service time of a thermostat, which is over 10 years.

With the embodiment shown in FIG. 1, the brightness of the display 103 is turned down at certain time intervals (as will be discussed) by control unit 101. Correspondingly, control unit 101 can switch to a low power consumption state, resulting in a substantial power saving. Moreover, the life span of the backlight of LCD 103 can be extended.

Table 1 illustrates an example of the power savings when the backlight of LCD 103 is activated only during selected time durations. In the example, it is assumed that the LCD backlight and control unit 101 draw 30 mA during operation. Typical capacity of an AA size alkaline battery is 1600 mAh.

TABLE 1

Example of power conception for LCD display

| Operation time per day | Average current | Battery life |
| --- | --- | --- |
| Fully turn on | 30 mA | 2.2 days |
| 20 minutes | 0.42 mA | 160 days |
| 10 minutes | 0.21 mA | 320 days |
| 5 minutes | 0.10 mA | 640 days |

In the above example, if one can reduce the LCD operation time to about 5 minutes per day, the battery life will be well over 1 year. Furthermore, selective activation of the LCD backlight can greatly extend the life of the backlight.

With a black and white LCD and under good lighting conditions, a backlight is typically not required for a user to view the LCD. For example, if the user only wants to check the room temperature of the thermostat or whether the heating is turned on, the user only needs to glance at the black and white LCD. However, with color LCD 103 the user typically needs to turn on the backlight because color LCD 103 is often totally unreadable when the backlight is turned off. With a self-illuminated display, e.g., as an OLED, the user also needs to turn it on to read it.

While the embodiment shown in FIG. 1 supports a color display thermostat application, embodiments of the invention support a black and white LCD thermostat. With a black and white LCD, a backlight can be activated to enhance visibility by a user, especially under poor lighting conditions.

Prior art thermostats may shut-off the LCD backlight. However, the backlight is activated when any key or a dedicated light key is pressed. The LCD backlight typically turns off after 10 or 20 seconds of idle to save power. However, this control approach is not typically suitable for a color LCD or OLED. With a black and white LCD, the display may be readable when the backlight is turned off. For a color LCD or OLED, however, the display is typically unreadable without the brightness being activated.

Figure 5:
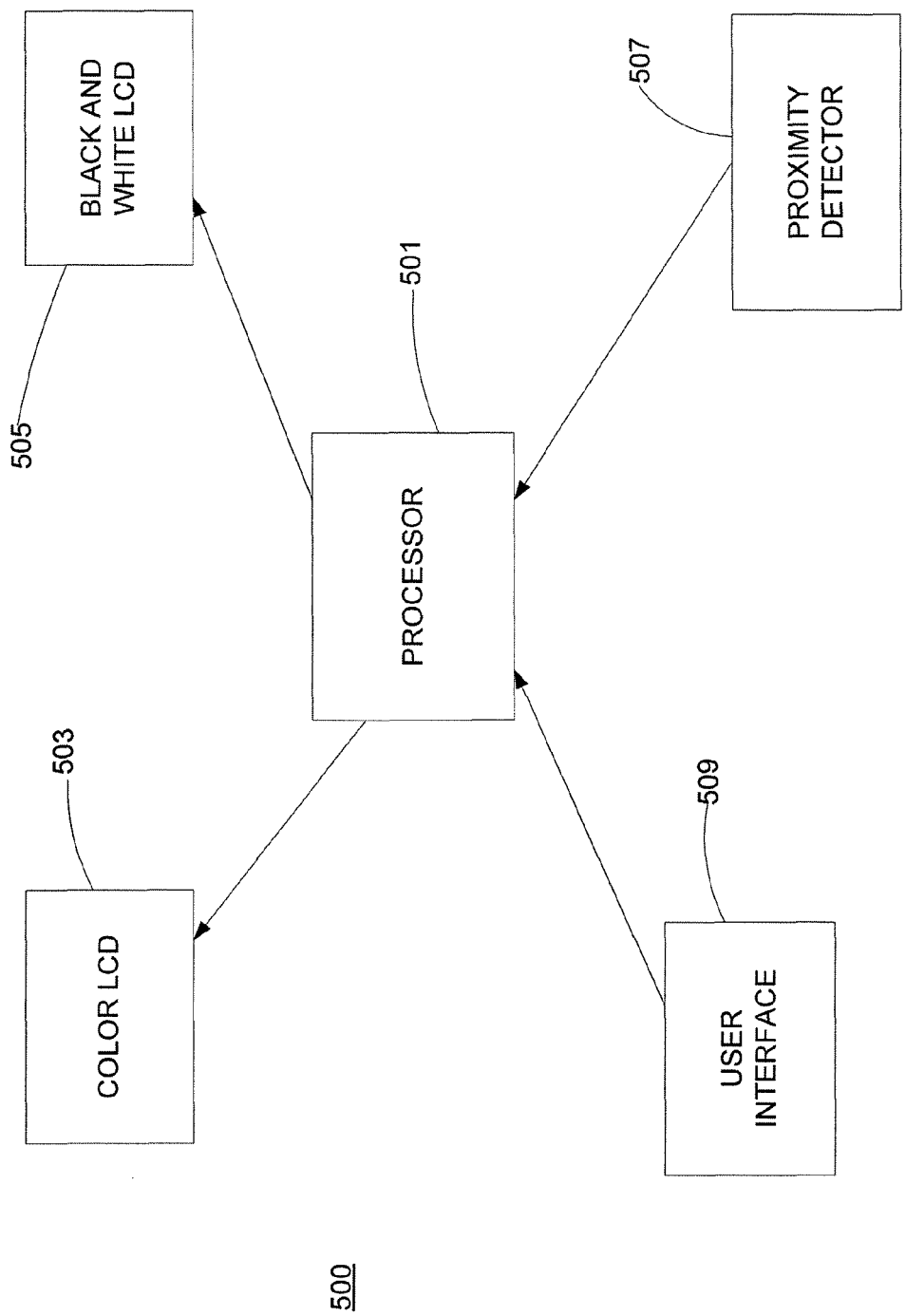
FIG. 5 shows a system that controls the brightness of a color display (e.g., Color LCD backlight or OLED display brightness) or a backlight of a black and white liquid crystal display based on a degree of motion in accordance with an embodiment of the invention.

With embodiments of the invention, a proximity sensor (e.g., proximity detector 507 as shown in FIG. 5) is used to detect objects (e.g., the user) approaching the thermostat (system 100 as shown in FIG. 1). A user typically can barely read a 2 inch display at a distance of over 1 m. Consequently, a proximity sensor is typically designed to detect an external object within 1.5 meter. As will be discussed, if the proximity detector detects a sufficient degree of movement, the display unit is activated.

System 100 supports a proximity sensor by incorporating infrared transmitter 105 and infrared receiver 107. Infrared sensors are typically cost-effective and readily available. Also, infrared sensors can work in total darkness and draw very little current.

Figure 2:
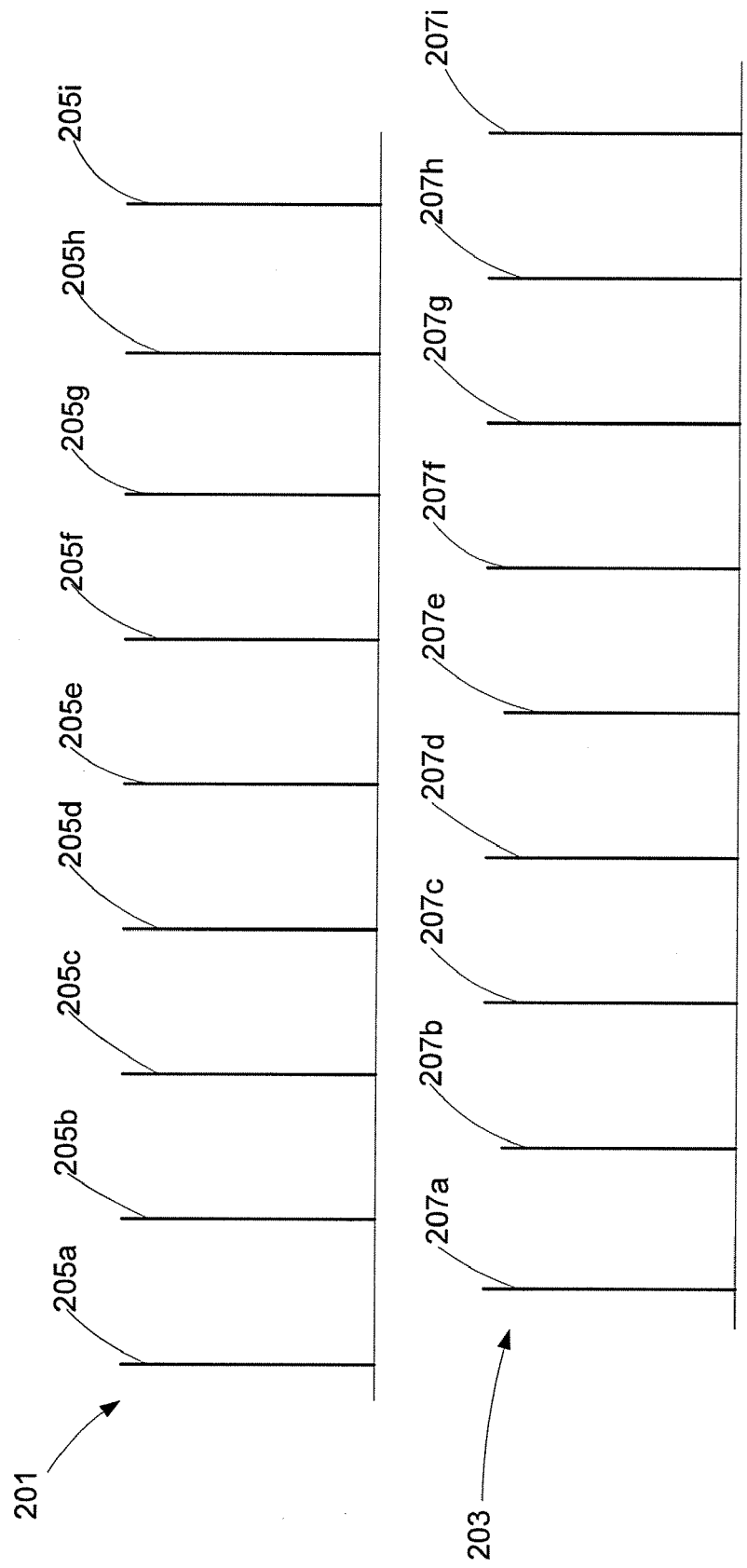
FIG. 2 shows a transmitted signal and a received signal for proximity detection in accordance with an embodiment of the invention.

FIG. 2 shows transmitted signal 201 and received signal 203 for proximity detection in accordance with an embodiment of the invention. The proximity detector includes IR transmitter 105 and IR receiver 107, operating in conjunction with control unit 101 (as shown in FIG. 1). IR transmitter 105 periodically sends out transmitted IR signal 201, and IR receiver 107 detects the reflected signal 203. For example, with an embodiment of the invention, transmitted signal 201 comprises pulses 205a-205i. Received signal 203 comprises pulses 207a-207i, which correspond to pulses 205a-205i being reflected from an object (e.g., the user). The signal strength of the reflected signal (received signal 203) is recorded so that control unit 101 can process the information to determine the proximity of the object as will be discussed.

If the environment within the detection range is static, the reflected signal strength is typically constant. For example, reflections off a wall result in an essentially constant received signal. However, when an object (e.g., the user) moves near the proximity sensor, the changing position of the object causes a variation of received signal 203. As exemplified in FIG. 2, the signal strengths of pulses 207a-207i (corresponding to samples of received signal 203) vary as result of a user approaching system 100. Control unit 101 detects a variation in the signal strength of received signal 203 and performs the following decisions:

If the variation of received signal 203 is small, the display unit is activated at partial (e.g., half) brightness (intensity). If the variation subsequently increases, the display unit may be activated at full brightness.

If the variation is large, the display unit is activated at full brightness.

The display brightness remains on until there is no key activity at the user interface or until received signal 203 returns to a constant signal level for a predetermined time duration (e.g., 15 seconds).

The variation of received signal 203 may be determined in a number of different ways. As an example, the variation may be determined from the variance of received signal 203. The variance, which is calculated by control unit 101, is given by:

$$\sigma^2 = \frac{\sum_{i=1}^{N} (x_i - \overline{x})^2}{N} \quad (\text{EQ. 1})$$

where N is the number of consecutive received pulses being analyzed, $x_i$ is the signal strength of the $i^{th}$ pulse of received signal 203, and $\overline{x}$ is the average signal strength over the N pulses.

Figure 3:
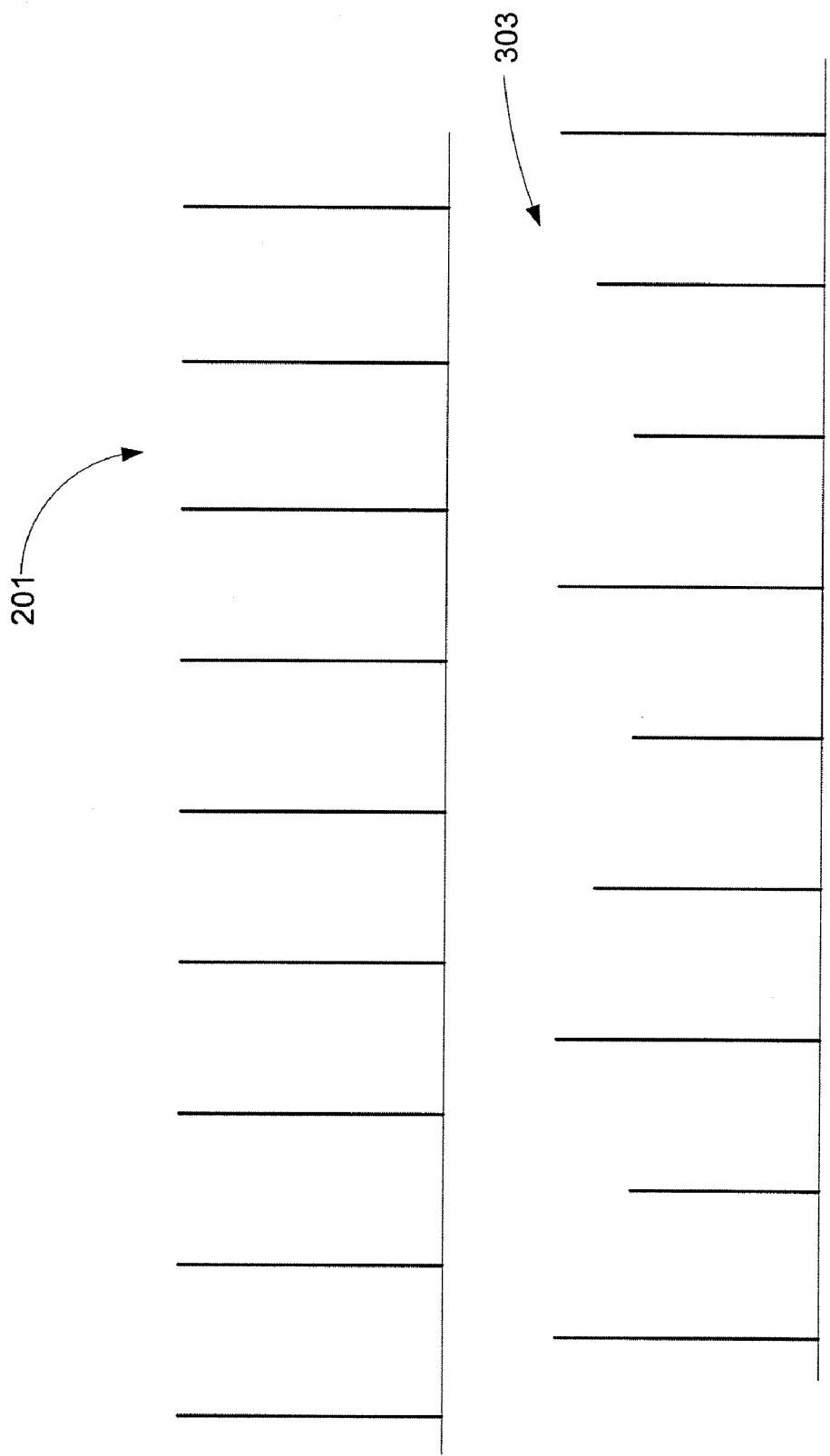
FIG. 3 shows a transmitted signal and a received signal for proximity detection in accordance with an embodiment of the invention.

FIG. 3 shows transmitted signal 201 and received signal 303 for proximity detection in accordance with an embodiment of the invention. Comparing received signal 303 with received signal 203, one observes that the variation of received signal 303 is larger. Consequently, the corresponding degree of movement is larger.

Figure 4:
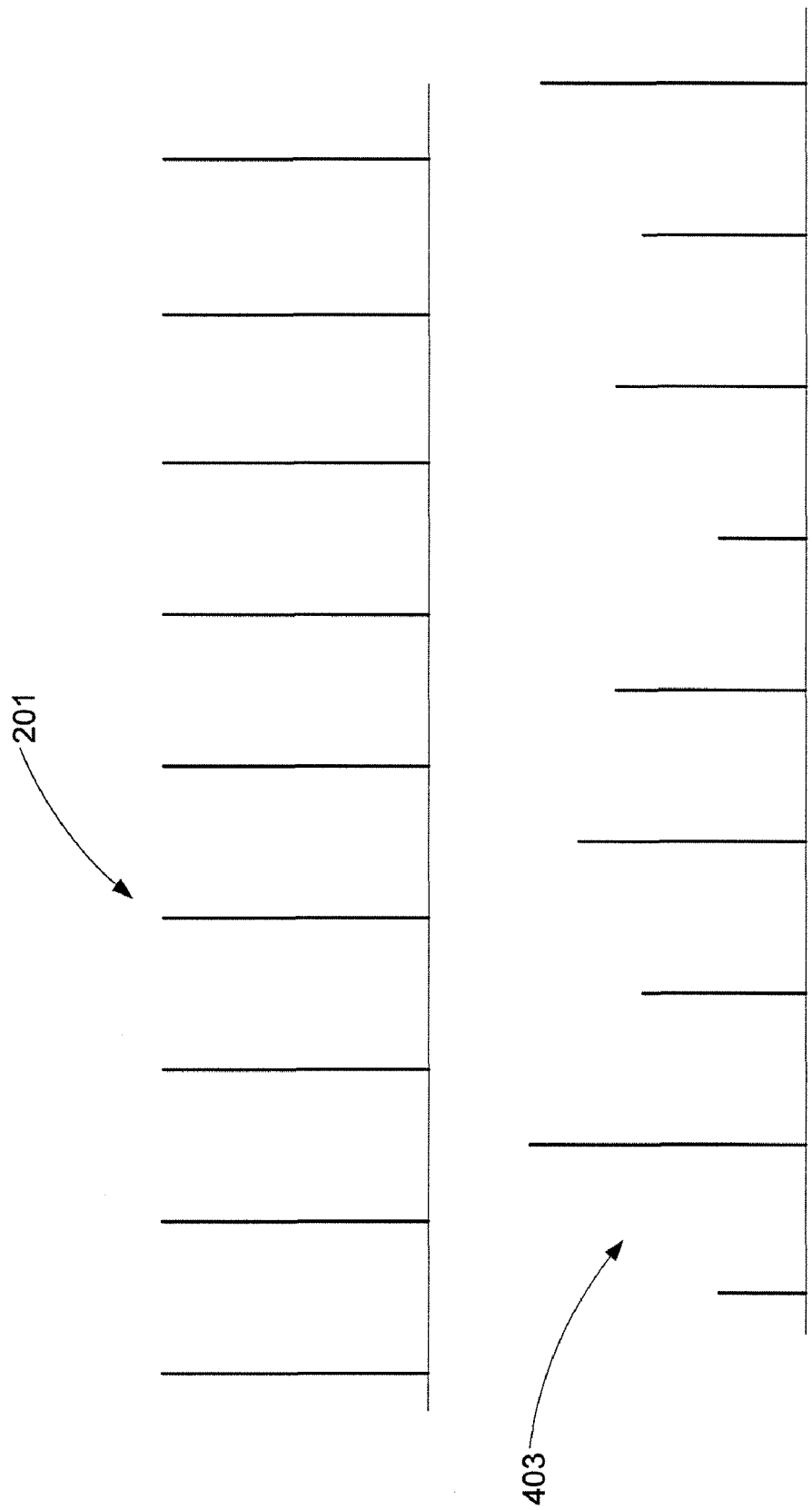
FIG. 4 shows a transmitted signal and a received signal for proximity detection in accordance with an embodiment of the invention.

FIG. 4 shows transmitted signal 201 and received signal 403 for proximity detection in accordance with an embodiment of the invention. Comparing received signal 403 with received signals 203 and 303, one observes that the variation of 403 is larger. Consequently, the corresponding degree of movement is larger.

FIG. 5 shows system 500 that activates the brightness of a color display unit 503 or a backlight of a black and white liquid crystal display 505 based on a degree of motion in accordance with an embodiment of the invention. As will be discussed with FIG. 7, processor 501 utilizes black and white LCD 505 when the degree of movement is sufficiently small but utilizes color display unit 503 when the degree of movement is larger. Proximity detector 507 determines the degree of movement of a user. If proximity detector 507 does not detect a sufficient degree of movement or no key activity is detected from user interface 509, processor 501 deactivates the color display unit 503 and black and white LCD 505. As previously discussed, the user may be able to discern black and white LCD 505 without activating the backlight if the ambient lighting is sufficient.

Figure 6:
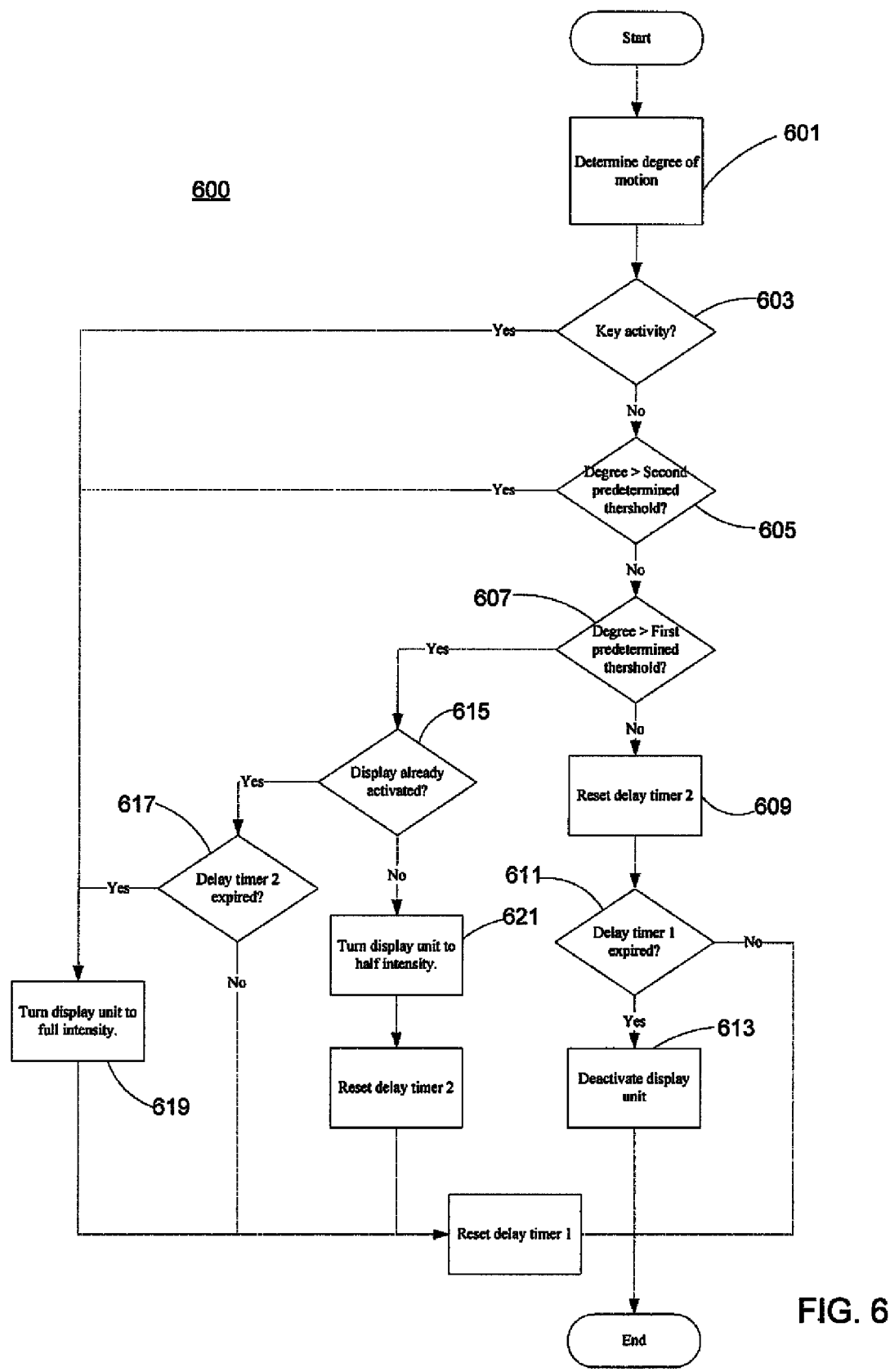
FIG. 6 shows a flow diagram for controlling the brightness of a display in accordance with an embodiment of the invention.

FIG. 6 shows flow diagram 600 for activating the color display unit 103 (as shown in FIG. 1) in accordance with an embodiment of the invention. In step 601, the degree of motion is determined. In step 603 if there is any key activity detected in step 603, the display unit is turned on at full intensity as performed by step 619.

If the degree of motion is greater than a second predetermined threshold (as determined by step 605), then the display unit is turned on at full intensify in step 619. The second predetermined threshold corresponds to a high level of detected movement. If not, then the degree of motion is compared with a first predetermined threshold (as determined by step 607). The first predetermined threshold corresponds to a low level of detected movement. If the degree is less than the first predetermined threshold, then the display unit is deactivated in step 613 after predetermined time duration (delay timer 1) in step 611. Delay timer 2, as will be discussed, is also reset in step 609.

If the degree of motion is greater than the first predetermined threshold (as determined by step 607), then step 615 determines if the display unit was previously activated. If not, then the display unit is activated at half intensity in step 621. If the display unit was previously activated, then step 617 determines if delay timer 2 has expired in step 617. If so, then the display unit is activated at full intensity in step 619. (The display unit is activated at full intensity if there are prolonged low activities detected.) If not, then the display unit remains at the previous intensity level.

Additional predetermined thresholds may be incorporated in flow diagram 600 to provide additional intensity levels for the display unit (e.g., by varying the voltage level or the duty cycle of the applied signal powering the backlight).

FIG. 7 shows flow diagram 700 for activating a color display unit (e.g., the backlight to color LCD 503 as shown in FIG. 5) or a black and white display unit (e.g., the backlight of black and white LCD 505) in accordance with an embodiment of the invention. In step 701, the degree of motion is determined. Step 703 determines whether key activity is detected. If so, the color display unit is activated in step 713.

If key activity is not detected, step 705 determines if the degree of motion is greater than a second predetermined threshold. If so, the color display is activated in step 713. (The second predetermined threshold corresponds to a high level of detected movement.)

If the degree of motion does not exceed the second predetermined threshold, then step 707 determines if the degree of motion exceeds the first predetermined threshold. (The first predetermined threshold corresponds to a low level of detected movement.) If so, then the black and white display unit is activated in step 715.

If the degree of motion does not exceed the first predetermined threshold, step 709 determines whether the delay timer has expired. If so the display units are deactivated in step 711.

While not shown in flow diagram 700, the black and white display unit (e.g., LCD 505) may be activated only if the ambient lighting is sufficiently low as measured by a lighting sensor (not shown in FIG. 5).

While not shown in flow diagram 700, display unit 503 may be activated at different intensities based on the detected degree of movement. In such a case, additional predetermined thresholds would be provided.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
a display unit configured to display information to a user and having a backlight to illuminate the display;
a proximity circuit configured to generate a transmitted signal and to receive a received signal that is indicative of a user's proximity; and
a control unit coupled to the display and the proximity detector and configured to perform:
obtaining the received signal from the proximity detector;
analyzing the received signal to determine a current degree of motion of the user's proximity;
when the current degree of motion is not greater than a first predetermined threshold and not greater than a second predetermined threshold for at least a first predetermined time duration, deactivating the display unit;

when the current degree of motion is greater than the first predetermined threshold and not greater than the second predetermined threshold and the display unit is not already activated, turning the display unit to a first intensity level;

when the current degree of motion is greater than the second predetermined threshold, turning the display unit on a second intensity level, wherein the first intensity level and the second intensity level are different; and when the current degree of motion is greater than the first predetermined threshold and not greater than the second predetermined threshold for at least a second predetermined time duration and the display unit is already activated, turning the display unit to the second intensity level.

2. The apparatus of claim 1, wherein the control unit is further configured to perform:

when the display unit is at the first intensity level and when a subsequent degree of motion is greater than the second predetermined threshold, activating the display unit at the second intensity level.

3. The apparatus of claim 1, wherein the proximity circuit is configured to determine a variation of the received signal and to obtain the current degree of motion from the variation.

4. The apparatus of claim 1, wherein the control unit is further configured to perform:

when the current degree of motion is greater than a third predetermined threshold, turning the display unit on a third intensity level.

5. The apparatus of claim 1, wherein the proximity circuit comprises:

an infrared (IR) transmitter configured to send the transmitted signal; and an infrared receiver configured to detect the received signal, wherein the received signal corresponds to the transmitted signal being reflected from an external object.

6. The apparatus of claim 5, wherein the infrared transmitter is configured to periodically send the transmitted signal.

7. The apparatus of claim 1, wherein the apparatus comprises a thermostat.

8. The apparatus of claim 1, wherein the display unit comprises a liquid crystal display (LCD).

9. The apparatus of claim 1, wherein the display unit comprises an organic light emitting diode (OLED) display.

10. The apparatus of claim 1, wherein the display unit comprises a light emitting diode (LED) display.

11. The apparatus of claim 1, wherein the display unit includes a backlight to illuminate the display unit.

12. The apparatus of claim 1, wherein the control unit is further configured to perform:

when a subsequent degree of motion is below a predetermined low level, deactivating the display unit.

13. A method comprising:

displaying information to a user on a display unit;

transmitting a transmitted signal;

receiving a received signal that is indicative of proximity of the user, wherein the received signal corresponds to the transmitted signal being reflected from an external object;

analyzing the received signal to determine a current degree of motion of the user's proximity;

when the current degree of motion is not greater than a first predetermined threshold and not greater than a second predetermined threshold for at least a first predetermined time duration, deactivating the display unit;

when the current degree of motion is greater than the first predetermined threshold and not greater than the second predetermined threshold and the display unit is not already activated, turning the display unit to a first intensity level;

when the current degree of motion is greater than the second predetermined threshold, turning the display unit on a second intensity level, wherein the first intensity level and the second intensity level are different; and when the current degree of motion is greater than the first predetermined threshold and not greater than the second predetermined threshold for at least a second predetermined time duration and the display unit is already activated, turning the display unit to the second intensity level.

14. The method of claim 13, further comprising:

when the display unit is at the first intensity level and when a subsequent degree of motion is greater than the second predetermined threshold, activating the display unit at the second intensity level.

15. The method of claim 13, further comprising:

determining a variation of the received signal; and obtaining the current degree of motion from the variation.

16. The method of claim 15, wherein the determining comprises:

obtaining an average signal strength of the received signal:

measuring a difference between a sampled signal strength of the received signal and the average signal strength;

squaring the difference; and repeating the measuring and the squaring for each sample of a set of consecutive samples.

17. The method of claim 13, further comprising:

determining an applied power level applied to the display unit to provide a desired intensity level for the display unit.

18. The method of claim 13, further comprising:

when the current degree of motion is greater than a third predetermined threshold, turning the display unit on a third intensity level.

19. The method of claim 13, further comprising:

when a subsequent degree of motion is below a predetermined low level, deactivating the display unit.

20. The method of claim 13, further comprising:

when no key activity is detected for a predetermined time duration, deactivating the display unit.

21. The apparatus of claim 3, wherein the variation of the received signal is obtained from a variance of the received signal.

22. The method of claim 15, wherein the variation of the received signal is obtained from a variance of the received signal.

* * * * *